United States Patent [19]
Saur et al.

[11] Patent Number: 4,875,536
[45] Date of Patent: Oct. 24, 1989

[54] CONTROL DEVICE FOR OPERATING A MOTOR VEHICLE

[75] Inventors: Niko K. Saur, Roigheim; Wolfgang Bronner, Neudenau-Kressbach, both of Fed. Rep. of Germany

[73] Assignee: Agria-Werke GmbH, Möckmühl, Fed. Rep. of Germany

[21] Appl. No.: 221,997

[22] Filed: Jul. 20, 1988

[30] Foreign Application Priority Data

Jul. 20, 1987 [DE] Fed. Rep. of Germany ....... 3723965

[51] Int. Cl.⁴ .............................................. B62D 6/00
[52] U.S. Cl. .................................................. 180/6.32
[58] Field of Search ....................... 180/6.2, 6.24, 6.32, 180/6.34; 74/506.5 H, 503, 504, 512, 513

[56] References Cited
U.S. PATENT DOCUMENTS 3,151,694 10/1964 Rogers ............................... 180/6.32
3,362,493 1/1968 Davis et al. .......................... 180/6.32
3,612,199 10/1971 Vissers ................................ 180/6.32

FOREIGN PATENT DOCUMENTS 1144121 9/1963 Fed. Rep. of Germany .

Primary Examiner—Charles A. Marmor
Assistant Examiner—Richard Camby
Attorney, Agent, or Firm—Henry M. Feiereisen

[57] ABSTRACT

A control device for operating a vehicle, in particular for driving and steering a motor vehicle, includes a two-armed lever which is suitably supported so as to be rotatable about a rotational axis and movable in a direction perpendicular to the rotational axis in order to permit steering operations and moving operations. For allowing a translational and a rotational motion, the lever is operatively connected to respective user-actuated members such as e.g. a steering wheel and a foot pedal and cooperates with each control member of hydrostatic transmissions for the drive wheels. Thus, an actuation of the steering wheel causes a translational motion of the lever which in turn displaces the control members of the drive wheels in a same direction while an actuation of the foot pedal rotates the lever so that the control members are displaced in a direction opposite to each other.

12 Claims, 3 Drawing Sheets

CONTROL DEVICE FOR OPERATING A MOTOR VEHICLE

BACKGROUND OF THE INVENTION

The present invention refers to a control device for operating a motor vehicle, and in particular to a control device for adjusting the direction of motion and velocity of a motor vehicle which includes individually drivable running gears at each side wall thereof, two drive units each cooperating with a control member for altering the driving power transmittable to the respective running gears and the drive direction, and two user-actuated members respectively connected to the control members, with one user-actuated member shifting both control members in a same direction and with the other user-actuated member shifting both control members in opposite direction so as to allow a control of the travelling motion and/or the steering motion A control device of this type is used in tractors, wheel loader, excavators or the like. The drive unit frequently includes hydrostatic transmissions with their output torque being transmitted directly or indirectly onto the drive wheels or drive chains of such vehicles. The maneuverability is attained by adjusting varying output speeds and/or directions of rotation of the hydrostatic transmissions acting on the running gears, and the travelling motion is carried out by setting the same output speeds and directions of rotation of these transmissions. Conventional user-actuated members for carrying out the steering motion and travelling motion are separately connected to the respective control members of the hydrostatic transmissions. This, however is disadvantageous as the structure becomes complicated. Moreover, the user-actuated members for the steering motion and the travelling motion frequently deviate in known control devices from the user-actuated members usually common in construction of vehicles, such as a steering wheel and foot pedal so that special care and training is demanded from the operator.

SUMMARY OF THE INVENTION

It is an object of the present invention to provide an improved control device of this type obviating the afore-stated drawbacks.

This object and others which will become apparent hereinafter are attained in accordance with the present invention by providing an actuating element which is connected to the control members and is rotatable about a rotational axis and movable in a direction perpendicular to the rotational axis wherein each of the user-actuated members is operatively connected to the actuating member in such a manner that an adjustment of one of the user-actuated members causes a translational motion of the actuating element and a displacement of the control members in a same direction, and that an adjustment of the other user-actuated member causes a rotation of the actuating element and a displacement of the control members in a direction opposite to each other.

The swinging motion and displacement of the actuating elements may be carried simultaneously and overlapping so that speed variations and directional variations may be made in a desired manner at the same time or independently of each other.

Preferably, the actuating element is a two-armed lever with one arm hinged to one of the control members and with another arm hinged to the other one of the control members. The lever includes a slider slidably guided in a guide element which is movable along a circular path about an axis extending essentially parallel to the rotational axis of the lever and being stationary relative to the rotational axis and is operatively connected to the respective one of the user-actuated member for allowing a rotation of the lever. Thus by actuating this user-actuated member, the guide element describes the circular path thereby taking along the slider and thus the two-armed lever which is rotated about its rotational axis.

Suitably, the guide element may be connected to a swivelling lever which is rotatable about the axis extending essentially parallel to the rotational axis of the two-armed lever and being stationary relative to the rotational axis, and is connected to a connecting rod at a distance to the axis which in turn is linked to the pertaining user-actuated member.

The translational motion of the lever may be obtained through provision of a connecting rod which is rotatably supported in the rotational axis of the lever and is operatively connected to the other user-actuated member. During the translational motion, the lever is accurately guided with its slider in the guide element.

Suitably, the connecting rod for transmitting the translational motion is hinged to a gear element at a distance to the rotational axis thereof which extends essentially parallel to the rotational axis of the lever. The gear element is provided with external teeth engaging in a rotatably supported pinion which is non-rotatably connected t the pertaining user-actuated member.

Preferably, one user-actuated member is a steering device while the other user-actuated member is a moving control device. Thus, during steering operations by means of e.g. a steering wheel, the two-armed lever is translationally moved with the control members of both drive units shifted in a same direction. Changing from forward to backing up and vice versa as well as speed variations are carried out by adjusting the other user-actuated member such as e.g. a foot pedal so that the lever is rotated thereby shifting the control members in an opposite direction. A connection of the user-actuated members to the control members of both drive units permits a very precise maneuvering.

It is certainly possible to define the one user-actuated member as moving control device and the other user-actuated member as steering device.

An especially good steering and driving behavior and an economic operation of a vehicle equipped with a control device according to the invention is attained when providing each drive unit as hydrostatic transmission with a hydraulic pump and a hydraulic motor wherein the speed and the rotational direction of the hydrostatic transmission is continuously regulated and adjustable by the respective control member. The driving motor required for driving the hydraulic pumps may then be operated for driving and steering operations at essentially constant speed in a favorable range.

The control device according to the invention is especially suitable for use in motor vehicles with two drive wheels and one or more non-driven support wheels which define a rotational axis and are freely swingable about a vertical axis extending perpendicular to the rotational axis, with the vertical axis being arranged before the rotational axis of the one or more support wheels. The support wheels swing automatically during steering motions obtained by differently driving both drive wheels.

The control device according to the invention gives the three-wheeled vehicle with a freely movable and non-driven support wheel a high maneuverability and superior operating convenience. When equipping the vehicle with a reaper as ancillary device and using it for mowing a lawn, not only its maneuverability is of great advantage but also the fact that driving and steering operations may be carried out at greatest care for the lawn. Even when turning the vehicle within a tight space, all wheels show rolling motions because both drive wheels can be operated in opposite direction to each other. Especially when the vehicle is equipped with tires of great width, the fact that all wheels roll provides a careful treatment of the lawn and is thus of great importance.

The control device according to the invention is of small overall size which makes its manufacture economical and more robust and allows the use of user-actuated members common in construction of vehicles for driving and steering operations. The control device may also suitable be used in single-axle or other two-axle or multi-axle vehicles, with one axle being driven and transmitting lateral guiding forces, or in vehicles with caterpillar chains.

BRIEF DESCRIPTION OF THE DRAWING

The above and other objects, features and advantages of the present invention will now be described in more detail with reference to the accompanying drawing n which.

DETAILED DESCRIPTION OF PREFERRED EMBODIMENTS

Figure 1:
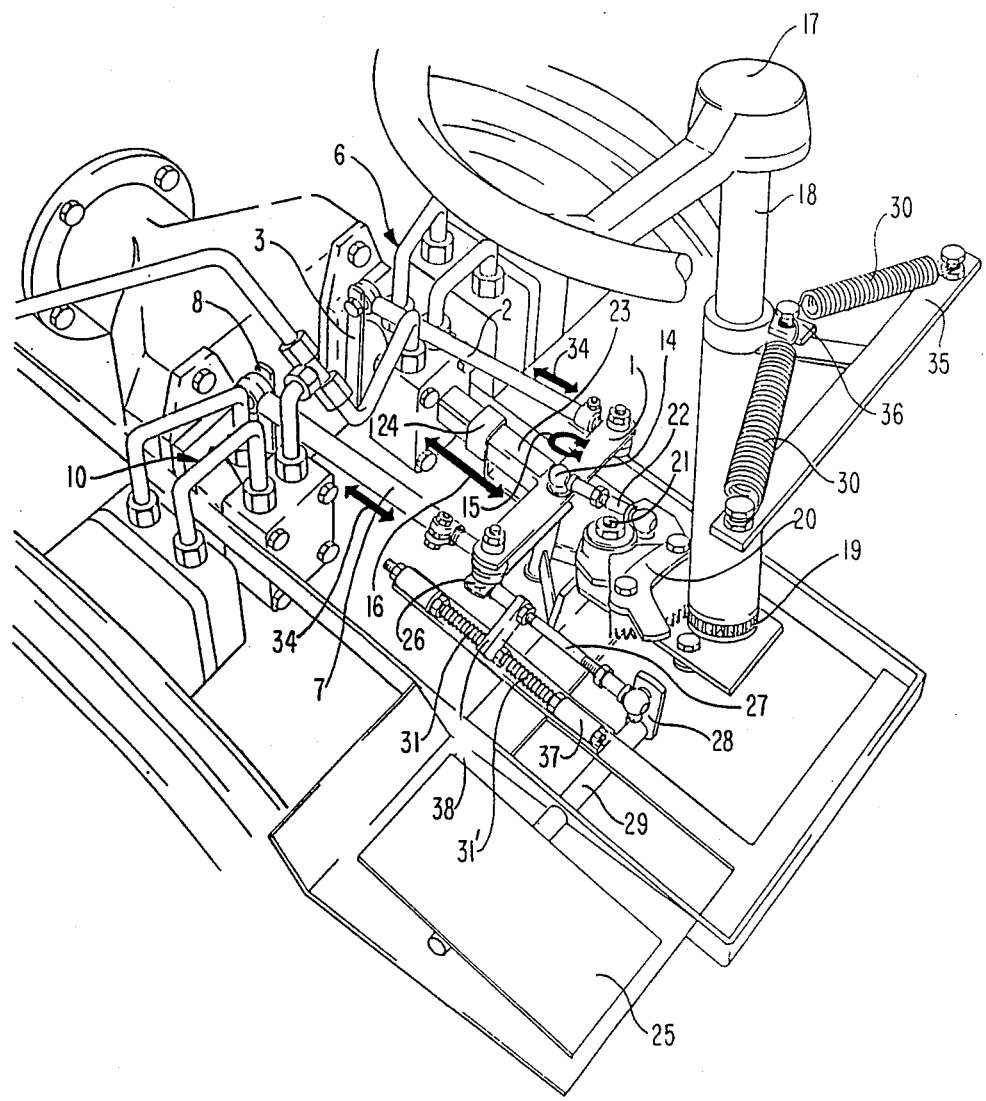
FIG. 1 is a perspective illustration of one embodiment of a control device according to the invention for a three-wheeled motor vehicle.

Referring now to the drawing and in particular to FIG. 1, there is shown a perspective view of a control device in accordance with the invention and incorporated in a motor vehicle for example a three-wheeled motor vehicle 5 with two front drive wheels 4, 9 and a rear support wheel 32. The control device includes a two-armed lever 1 with one arm linked to one end of a connecting rod 2. The other end of the connecting rod 2 is hinged to a control rod 3 which is part of a hydrostatic transmission generally designated by reference numeral 6 and acting on the left front wheel 4. Likewise, the other arm of the lever 1 is linked to one end of a connecting rod 7 which is hinged to a control rod 8 at the other end thereof. The control rod 8 is part of a hydrostatic transmission generally designated by reference numeral 10 and acting on the right front wheel 9 of the motor vehicle 5.

Both hydrostatic transmissions 6, 10 are of conventional type and include a hydraulic pump 11 controlled by the pertaining control rod 3, 8 and a hydraulic motor 12 connected to the pump 11 via suitable hydraulic conduits. The hydraulic motor 12 has an output shaft 13 which is connected to the respective drive wheel 4, 9 of the vehicle 5. A not shown internal combustion engine drives the pumps 11 of the transmissions 6, 10 and is also employed for driving ancillary devices like reapers mounted thereto.

Figure 3:
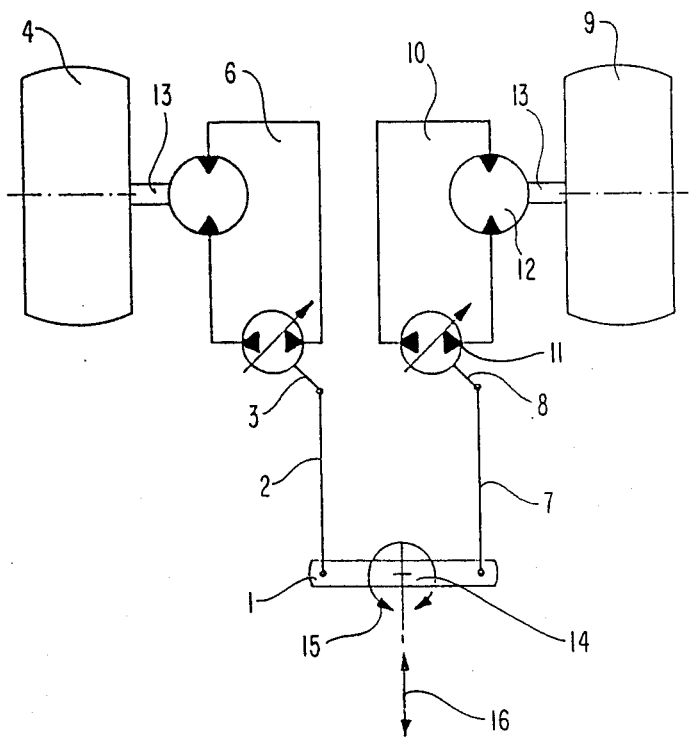
FIG. 3 is a schematic and simplified illustration of the control device installed in a three-wheeled vehicle and containing hydrostatic transmissions which constitute the driving units and are shown in schematic manner.

As shown schematically in FIG. 3, the pump 11 and the hydraulic motor 12 of each hydrostatic transmission 6, 10 are connected to each other in such a manner that a displacement of the control rods 3, 8 in a same direction causes only one of the drive wheels 4, 9 to be driven in forward direction while the other drive wheel brakes or drives backwards so that the vehicle 5 turns about a vertical axis, thus resulting in a change of direction. A movement of the control rods 3, 8 in opposite direction results in an increase or decrease of the speed of both drive wheels 4, 9 by a same amount so as to modify the velocity of the vehicle 5. Thus, by differently driving the front wheels 4, 9, the vehicle 5 can be maneuvered while a change of the speed of the vehicle 5 is attained by uniformly driving the front wheels.

The two-armed lever 1 is rotatable about a vertical axis 14 in either direction as indicated by double arrow 15 and is displaceable in a direction perpendicular to the rotational axis 14 in either direction as indicated by double arrow 16. A rotation of the lever 1 about the rotational axis 14 in direction of double arrow 15 causes the control rods 3, 8 to move opposite to each other so as to allow alteration of the speed of the vehicle 5 while a displacement of the lever 1 in direction of the double arrow 16 causes a displacement of the control rods 3, 8 in the same direction so as to modify the direction of motion of the vehicle 5. The reciprocating movement of the control rods 3, 8 during modification of the speed and direction is indicated by double arrows 34.

The displacement of the two-armed lever 1 in either direction of double arrow 16 is provided by a suitable steering device such as e.g. a steering wheel 17. The steering wheel 17 is connected to one end of a rotatable shaft 18 the other end of which is defined by a pinion 19 which is in engagement with teeth of a circular segment-shaped gear element 20. The gear element 20 is rotatable about an axis 21 which extends parallel to the rotational axis 14 of the lever 1. At a distance to the axis 21, the gear element 20 is connected to one end of a connecting rod 22 the other end of which is articulated to the lever 1 precisely on the rotational axis 14 thereof. In order to allow an accurate guidance, the lever 1 is of T-shape to define a rod-shaped slider 23 which is guided in a sleeve 24 of corresponding cross section during displacement of the lever 1.

It will be readily recognized that both rotational axes 14 and 21 need not necessarily extend parallel to each other. By providing the connecting rods 22 with spherical heads, angular deviations of up to about 25° are possible between both rotational axes 14, 21.

By rotating the steering wheel 17, the shaft 18 and thus the pinion 19 are turned thereby causing a rotation of the gear element 20 about the axis 21. The rotation of the gear element 20 shifts the connecting rod 22 which thus urges a displacement of the two-armed lever 1 in the respective direction of the double arrow 16, with the lever 1 accurately guided by the slider 23 within the guide sleeve 24.

The rotation of the lever 1 about the axis 14 is attained by a suitable moving control device such as e.g. a foot pedal 25 which may be designed in form of a rocker. The following set forth in more detail the linkage between the pedal and the lever 1.

Figure 2:
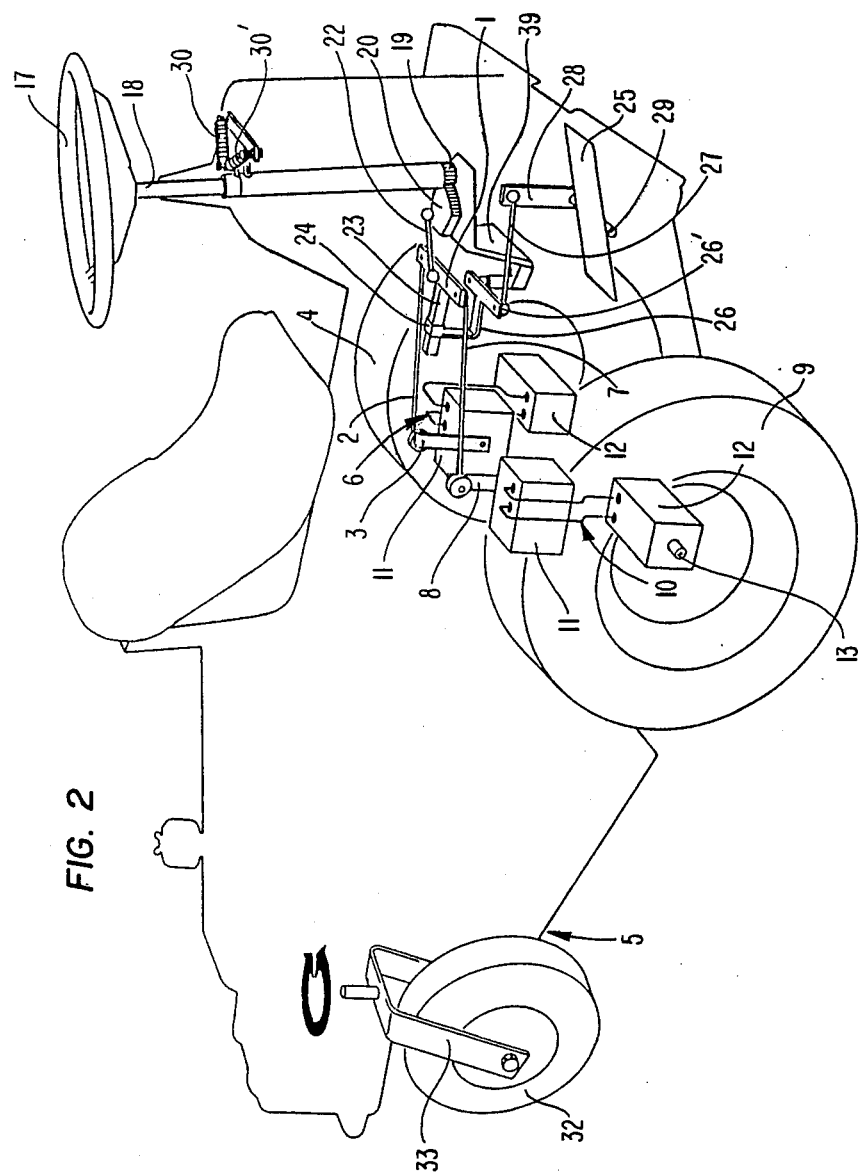
FIG. 2 is a schematic illustration of the three-wheeled motor vehicle, with the control device of FIG. 1 being shown in simplified manner for ease of illustration.

The guide sleeve 24 which guides the slider 23 of the lever 1 is attached at its underside to a swivelling lever 26 which as shown in particular in FIG. 2 is essentially of L-shape. The other end of the lever 26 is attached to a crosspiece 26 which has one end swingably mounted to a support 39 to define a stationary axis which extends parallel to the rotational axis 14. Thence, the guide sleeve 24 is rotatable along a circular path about the rotational axis of the swivelling lever 26. Upon rotation of the sleeve 24, the slider 23 follows this rotation and adjusts the lever 1 accordingly.

The other end of the crosspiece 26, remote to the rotational axis of the swivelling lever 26 is hinged to the end of a connecting rod 27, the other end of which r,s articulated to one end of a turning arm 28. The other end of the turning arm 28 sits on the end of a rotatable shaft 29 which suitably supports the foot pedal 25.

Depressing the pedal 25 causes a rotation of the shaft 29 and thus of the turning arm 28, thereby displacing the connecting rod 27 which in turn forces a rotation of the swivelling lever 26 with the guide sleeve 24. The rotation of the sleeve 24 is transmitted to the slider 23 and thus to the lever 1 so as to rotate the latter in a respective direction of the double arrow 15.

It will be readily recognized that the rotational and the translational motion of the two-armed lever 1 can certainly be executed simultaneously so as to allow a change of speed and direction of motion at the same time.

As shown in FIG. 1, a T-shaped support 35 is attached to the shaft 18 at a suitable location thereof for supporting at opposing ends one end of a pair of oppositely acting springs 30, 30, the other end of which is connected to a suitably fixed support 36. Thus, when actuating the steering wheel 17 so as to rotate the shaft 18, a release of the steering wheel 17 in this position will cause the wheel 17 to return in its central position in which the vehicle 5 drives straight ahead. The forced return of the steering wheel 17 into its central or neutral position ensures a secure driving behavior.

In order to return the foot pedal 25 and the connecting rod 27 to the zero position after actuation, a spring rod 37 is provided parallel to the connecting rod 27 and linked thereto via a coupling element 38. As shown in FIG. 1, the coupling element 38 divides the spring rod 37 into two section, with each section supporting a spring 31, 31. The springs 31, 31 act in opposite direction so that after releasing the pressure on the foot pedal 25, the spring rod 37 by means of the respective spring 31, 31 urges the connecting rod 27 into the neutral position or zero position in which no driving force acts on the wheels 4, 9.

By designing the foot pedal 25 as rocker, the actuation of the foot pedal 25 in direction beyond the neutral position allows a control of the speed in forward drive as well as in rearward drive.

If desired, the moving control device 25 may also be defined by a manually operated hand throttle. The steering wheel may also substituted by a control horn.

The control device in accordance with the invention may be modified by providing the steering maneuver through rotation of the two-armed lever 1 and the driving velocity by shifting the lever 1. It is certainly also conceivable to substitute the two-armed lever by a different actuating element such as e.g. a disk or a fork-type joint as long as an adjustment in a same direction and in an opposite direction of both hydrostatic transmissions is possible.

In the nonlimiting example as shown in the drawing, the motor vehicle 5 is a three-wheeler with one rear support wheel 32 (FIG. 2) freely rotatably supported between the arms of a fork 33 which is freely swingable about a vertical axis extending perpendicular to and in front of the rotational axis of the support wheel 32 when viewed in driving direction. During changing of the driving direction of the vehicle by differently driving both front drive wheel 4, 9, the support wheel 32 is automatically turned. When backing up the vehicle 5 after being initially driven forwards, the support wheel 32 rotates about an angle of 180° about the swivelling axis of the fork 33 so that the rotational axis of the support wheel 32 extends again when viewed in driving direction behind the swivelling axis of the fork 33.

It is certainly conceivable to use two or more freely rotatable following wheels as long as the following wheels are not self-tracking.

While the invention has been illustrated and described as embodied in a Control Device for Operating a Motor Vehicle, it is not intended to be limited to the details shown since various modifications and structural changes may be made without departing in any way from the spirit of the present invention.

What is claimed as new and desired to be protected by Letters Patent is set forth in the appended claims:

We claim:

1. A control device for operating a vehicle; comprising
running gears arranged at each side of the vehicle;
driving means cooperating with said running gears for allowing the latter to be driven separately of each other, said driving means including a control member for each of said running gears;
a pair of user-actuated members; and
connecting means for operatively linking said user-actuated members to said control members, said connecting means including an actuating element connected to said control members, said actuating element being rotatable about a rotational axis and movable in a direction perpendicular to said rotational axis, each of said user-actuated members being operatively connected to said actuating element so that an adjustment of one of said user-actuated members causes a translational motion of said actuating element and a displacement of said control members in a same direction as said actuating element, and an adjustment of said other user-actuated member causes a rotation of said actuating element and a displacement of said control members in a direction opposite to each other.

2. A control device as defined in claim 1 wherein said actuating element is a two-armed lever with one arm hinged to one of said control members and with another arm hinged to the other one of said control members.

3. A control device as defined in claim 2 wherein said guide means includes a slider connected to said actuating element and a guide element receiving said slider for slidably guiding the latter, said guide element being movable along a circular path about an axis which extends essentially parallel to said rotational axis of said actuating element and is stationary relative to said rotational axis, said guide element being moved along said circular path to rotate said actuating element about its rotational axis upon actuation of said other user-actuated member.

4. A control device s defined in claim 3 wherein said connecting means further includes a swivelling lever connected to said guide element and rotatable about said axis, and a connecting rod linked to said swivelling lever at a distance to said axis and being connected to said other user-actuated member.

5. A control device as defined in claim 3 wherein said connecting means further includes a connecting rod fixed to said actuating element at its rotational axis and linked to said one user-actuated member so that an adjustment of said one user-actuated member causes a displacement of said connecting rod and a translational motion of said actuating element with its slider guided in said guide element.

6. A control device as defined in claim 5 wherein said connecting means further includes a gear element rotatable about an axis essentially parallel to said rotating axis of said two-armed lever and being provided with external teeth, and a rotatably supported pinion non-rotatably connected to said one user-actuated member and engaging said teeth of said gear element, said connecting rod being articulated to said gear element at a distance to said axis.

7. A control device as defined in claim 1 wherein said one user-actuated member is a steering unit and said other user-actuated member is a moving control unit.

8. A control device as defined in claim 1 wherein said one user-actuated member is a moving control unit and said other user-actuated member is a steering unit.

9. A control device as defined in claim 1 wherein said driving means includes a hydrostatic transmission with a hydraulic pump and a hydraulic motor, said hydrostatic transmission having a speed and a direction of rotation which are continuously regulated and adjustable by said control members.

10. A control device as defined in claim 1 in a motor vehicle with two drive wheels and one or more non-driven support wheels defining a rotational axis and being freely swingable about a vertical axis extending perpendicular to said rotational axis of said drive wheels wherein said vertical axis is arranged before said rotational axis of said one or more support wheels.

11. A control device as defined in claim 1, and further comprising spring means for returning said user-actuated members into their neutral position after actuation thereof, said spring means including oppositely acting springs, acting on said user-actuated members.

12. A control device as defined in claim 1, and further comprising guide means operatively connected to said other user-actuated member for rotating said actuating element upon actuation of said other user-actuated member, said guide means being additionally provided for guiding said actuating element upon translational movement thereof.

* * * * *